C. H. ORTMAN.
SELF LUBRICATING BOLT.
APPLICATION FILED JULY 16, 1920.

1,428,251.

Patented Sept. 5, 1922.

Inventor
Charles H. Ortman,
By Bull, Smith, Bock & West,
Attys

Patented Sept. 5, 1922.

1,428,251

UNITED STATES PATENT OFFICE.

CHARLES H. ORTMAN, OF CLEVELAND, OHIO.

SELF-LUBRICATING BOLT.

Application filed July 16, 1920. Serial No. 396,763.

*To all whom it may concern:*

Be it known that I, CHARLES H. ORTMAN, a citizen of the United States, residing at Cleveland, in the county of Cuyahoga and State of Ohio, have invented a certain new and useful Improvement in Self-Lubricating Bolts, of which the following is a full, clear, and exact description, reference being had to the accompanying drawings.

This invention relates to self lubricating bolts, and has particular reference to shackle bolts for use in connection with automobile springs.

Some of the objects of the present invention are: to provide a bolt which shall include a lubricant reservoir, whereby the necessity of frequent attention for lubricating is eliminated; to provide a bolt which shall be rotatable to permit even wear on the exterior thereof and within the bushing thereof, thereby to prolong the life of the connection; to provide a bolt which shall be simple in construction, efficient in operation, and inexpensive to manufacture; while further objects and advantages will be more fully set forth in the appended description and claims.

Figure 1:
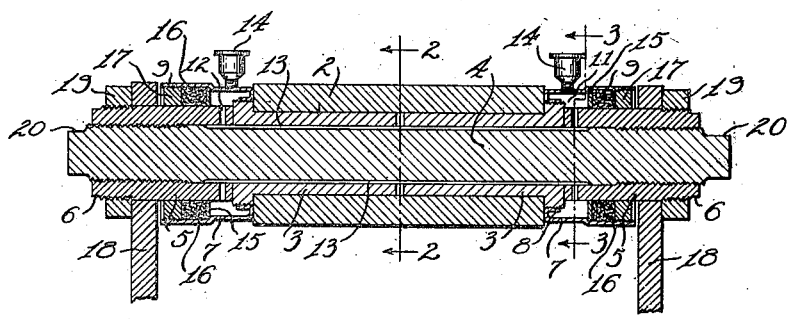
Figure 2:
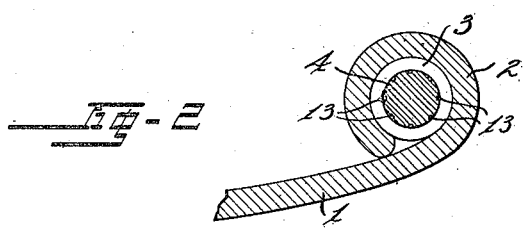
Figure 3:
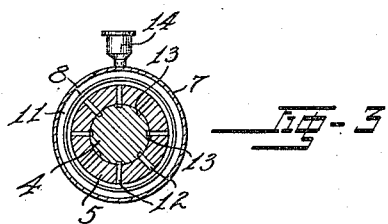

In the accompanying drawing wherein I have illustrated an embodiment of my invention, Fig. 1 is a longitudinal sectional view of my bolt showing it in position in the eye and shackles of a suitable spring; and Figs. 2 and 3 are sectional views taken on the lines 2—2 and 3—3, respectively, of Fig. 1.

Describing by reference characters the various parts illustrated, 1 indicates the end portion of a spring which is formed with an eye 2 to receive the opposed bushing members 3, 3. A bolt 4 is rotatably supported within the bushing members 3, 3 and is securely held from longitudinal movement by the bearing thimbles or thrust members 5, 5 each having a squared head 6, 6 and each threaded on an end of said bolt to abut the head portions of the bushings 3, 3 respectively. A cylindrical housing member 7, having a turned under end 8 and an offset portion 9, is pressed or threaded (as shown) on the head of each bushing 3 and forms thereabout and therebeyond a reservoir 11 which communicates, through a plurality of bores 12 formed in the thimbles 5, 5 with a plurality of longitudinally extending lubricant ducts 13, disposed about the lateral surface of the bolt 4. Each reservoir may be filled through a suitable cup 14, threaded into each housing member 7.

To prevent the lubricant from working toward the outer ends of the bolt, a washer 15 is inserted within each member 7 to abut the shoulder formed by the offset portion 9, and suitable compressible packing 16 is next placed therein and is securely held by a washer 17 threaded into the outer end of the housing 7.

The shackles 18, 18 are slipped on the bearing thimbles 5, 5 and are held thereon by suitable nuts 19, 19 threaded on the outer ends of the thimbles 5, 5. Each end of the bolt 4 is squared, as shown at 20, providing an engaging portion for a wrench or other tool whereby the bolt may be partially rotated from time to time to insure uniform wear between the same and the interior of the bushing 3, 3.

While I have described and illustrated a particular construction for my bolt, it will be understood that changes may be made therein, within the scope of the appended claims.

Having thus described my invention, what I claim is:—

1. In a device of the class described, the combination, with a bushing, of a bolt rotatably positioned therein, a bearing thimble fastened to each end of said bolt and each engaging an end of said bushing, a housing spaced from and surrounding a portion of each of said thimbles and forming a tight joint with the adjacent end of said bushing, a shackle journaled on each of said thimbles, adjacent said housing, means for closing the outer portions of said housings, and means for supplying lubricant to the interior of said bushing.

2. In a device of the class described, the combination with a tubular member, of a pair of opposed bushing members inserted within said tubular member, a bolt rotatably positioned in said bushing members, a thrust member fastened to each end of said bolt and each abutting the end of a bushing member, a housing connected to each bushing member, spaced from and surrounding each of said thrust members, and means within the outer end of each housing to prevent the escape of lubricant therethrough, there being one or more ducts for supplying lubricant to the interior of said bushing members.

3. In a device of the class described, the combination, with a bushing, of a bolt rotatably positioned therein, a bearing thimble fastened to each end of said bolt and adapted to abut an end of said bushing, a housing secured to each end of said bushing and spaced from and surrounding a portion of each of said thimbles, a compressible packing in each housing, means carried by each housing for compressing the packing therein, and means for supplying lubricant to the interior of said bushing.

4. In a device of the class described, the combination, with a tubular member, of a bushing inserted within said member, a bolt rotatably positioned in said bushing, a thrust member fastened to each end of said bolt and each abutting the portion of said bushing adjacent thereto, a housing forming a tight joint with the outer end of each bushing, a washer in each housing, compressible packing in each housing located exteriorly of the washer therein, a closure threaded into the outer end of each housing, and means for supplying lubricant to the interior of said bushing.

5. In a device of the class described, the combination with a tubular member of a pair of opposed bushing members inserted within the first member and each extending beyond said member, a bolt rotatably positioned in said bushing members and having one or more ducts for lubricant extending within and beyond said members, a thrust member fastened to each end of said bolt and each abutting the adjacent end of a bushing member, and a housing fastened to the head of each bushing and spaced from and surrounding each of said thrust members to form a lubricant reservoir therebetween, there being one or more passageways formed in said thrust members to connect said reservoirs with said ducts.

6. In a device of the class described, the combination, with a bushing, of a bolt rotatably positioned therein, means fastened to each end of said bolt and abutting the ends of said bushing whereby said bolt and bushing are held from longitudinal displacement, and a housing spaced from and surrounding a portion of said bolt adjacent one end thereof and forming a lubricant reservoir therebetween, there being one or more ducts connecting said reservoir with the bearing surface of said bolt within said bushing.

7. In a device of the class described, the combination, with a bushing, of a bolt rotatably positioned therein, a thrust member fastened to each end of said bolt and abutting the ends of said bushing, and a housing spaced from and surrounding each of said thrust members to form a lubricant reservoir therebetween, there being one or more lubricant ducts connecting each of said reservoirs with the bearing surface of said bolt within said bushing.

8. In a device of the class described, the combination, with a tubular member, of a bolt rotatably positioned therein, there being one or more lubricant ducts formed in the surface of said bolt and extending beyond said tubular member, a thrust member fastened to each end of said bolt, and a housing spaced from and surrounding each of said thrust members to form a lubricant reservoir therebetween, there being one or more passageways formed in said thrust members to connect said reservoirs with said duct or ducts.

9. In a device of the class described, the combination, with a tubular member, of a bolt rotatably positioned therein, a thrust member fastened to each end of said bolt, a housing spaced from and surrounding a portion of each of said thrust members to form a lubricant reservoir thereabout, and means for conducting lubricant from said reservoir to the bearing surface of said bolt.

10. In a device of the class described, the combination, with a tubular member, of a pair of opposed bushing members inserted within said member, a bolt rotatably positioned in said bushing members, a thrust member fastened to each end of said bolt and each abutting the end of a bushing member, and a housing spaced from and surrounding each of said thrust members to form a lubricant reservoir therebetween, there being one or more lubricant ducts connecting each of said reservoirs with the bearing surface of said bolt.

In testimony whereof, I hereunto affix my signature.

CHARLES H. ORTMAN.